US005200285A

United States Patent [19]

Carrish

[11] Patent Number: 5,200,285
[45] Date of Patent: Apr. 6, 1993

[54] SYSTEM AND METHOD FOR FORMING MULTIPLY TONED IMAGES

[75] Inventor: Jeffrey J. Carrish, Milford, Mass.
[73] Assignee: Delphax Systems, Inc., Canton, Mass.

[21] Appl. No.: 496,442
[22] Filed: Mar. 20, 1990
[51] Int. Cl.$^5$ ..................... G03G 13/22; G03G 15/22; G01D 15/06
[52] U.S. Cl. ........................................ 430/45; 430/47; 430/54; 430/124; 430/126; 346/155; 346/157; 355/279; 355/285
[58] Field of Search ..................... 430/45, 47, 54, 124, 430/126; 346/155, 157; 355/279, 285

[56] References Cited

U.S. PATENT DOCUMENTS

| | | | |
|---|---|---|---|
| 3,364,857 | 1/1968 | Lein et al. | 430/124 X |
| 3,592,642 | 7/1971 | Kaupp | 430/124 |
| 3,716,360 | 2/1973 | Fukashima et al. | 430/126 X |
| 4,095,979 | 6/1978 | DiFrancesco et al. | 430/126 |
| 4,286,031 | 8/1981 | Kuehnle et al. | 430/126 X |
| 4,562,129 | 12/1985 | Tanaka et al. | 430/126 X |
| 4,654,282 | 3/1987 | Ng et al. | 430/54 |
| 4,887,095 | 12/1989 | Wataya et al. | 346/76 PH |
| 4,891,652 | 1/1990 | Sato et al. | 346/76 PH |
| 4,927,727 | 5/1990 | Rimai et al. | 430/124 X |
| 4,937,630 | 6/1990 | Yoshikawa et al. | 355/273 |

*Primary Examiner*—Roland Martin
*Attorney, Agent, or Firm*—Lahive & Cockfield

[57] ABSTRACT

A printing system forms a first electrostatic latent image on a dielectric member and tones the image with a first toner. The toned image is then consolidated on the dielectric member, and one or more additional toners are applied to form a multiply-toned image which is then fused and transferred to a sheet. At intermediate stages of forming the multiply-toned image, the previously applied toner is melted and cooled to consolidate it. A dielectric belt with a fast thermal response time allows the multicolor image to be efficiently formed on the belt and all colors transferred to a paper sheet which is fed once through the machine. The belt may receive latent images from a photosensitive imaging drum of conventional type, or may itself be a photosensitive belt which directly receives an optical image. Preferably, however, the electrostatic latent images are deposited on the belt by one or more electronically controlled printhead arrays. By charge coding the latent image, one printhead operating in a bipolar mode may deposit a single image which is toned with four colors. Images may also be consolidated directly on a latent imaging drum.

31 Claims, 5 Drawing Sheets

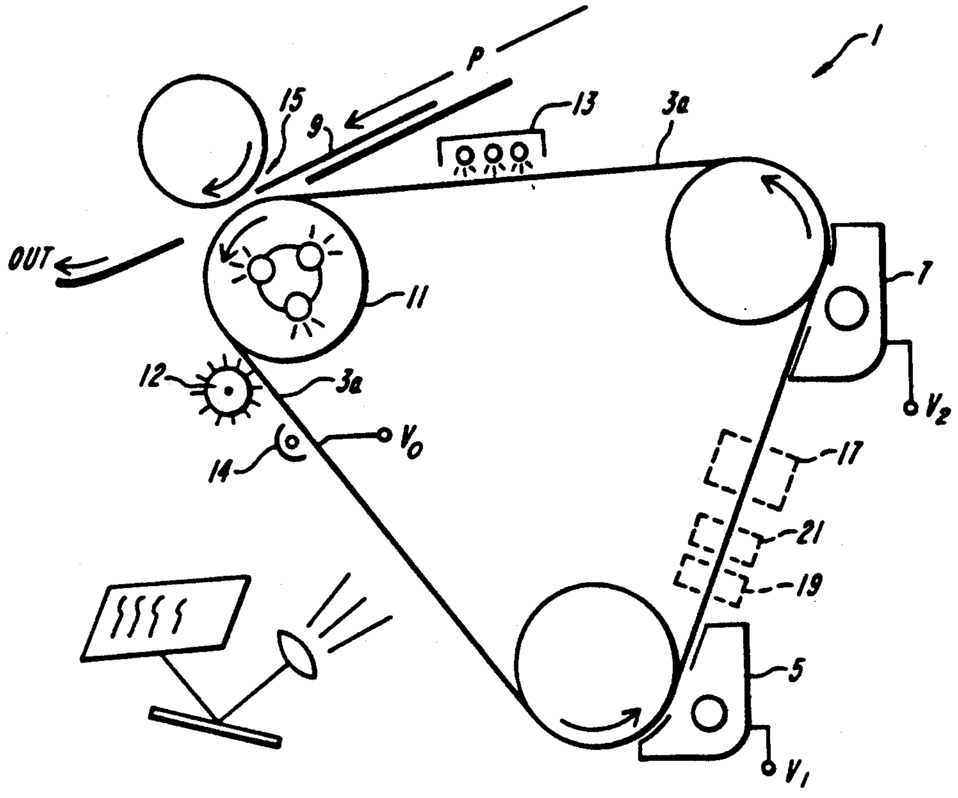
FIG. 5
FIG. 6
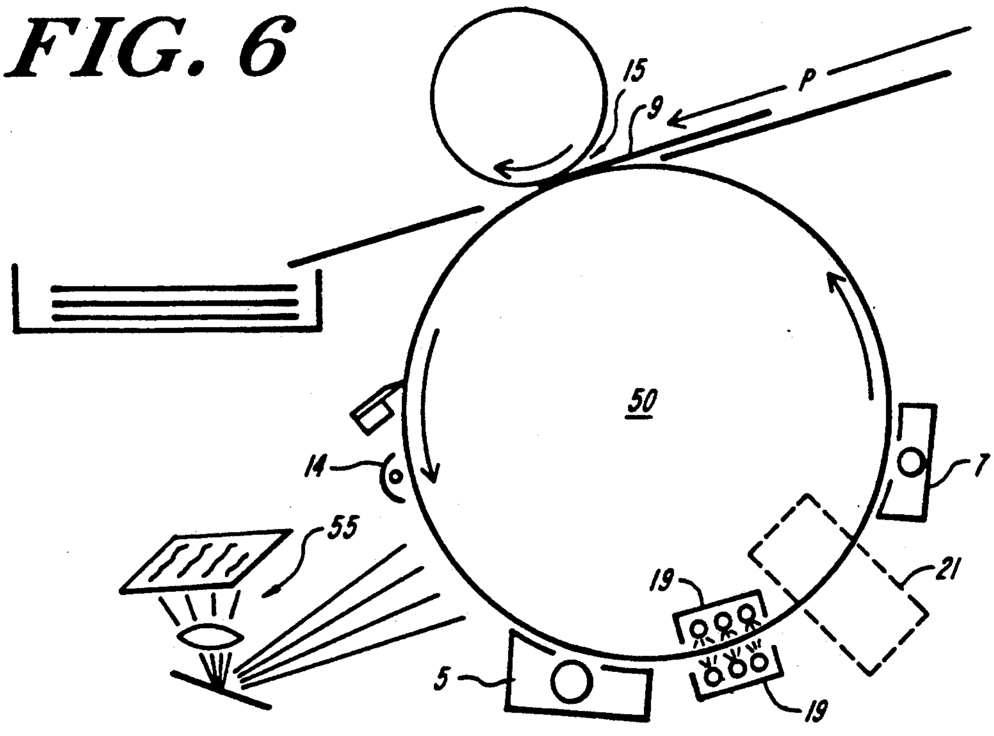

SYSTEM AND METHOD FOR FORMING MULTIPLY TONED IMAGES

BACKGROUND OF THE INVENTION

The present invention relates to printing and reproducing machines which tone an electrostatic latent image on a dielectric drum or belt, and which transfer the toned image to a recording member, such as a sheet of paper or film, in the form of a permanent print image.

In order to extend the construction of monotone black imaging conventional photocopiers, electrostatic printers or the like, to multicolor Printing with several toners of different colors, a number of constructions have been Proposed. These may involve constructions such as photocopiers which apply color separation images to different photoconductive drums and require multiple passes of the recording sheet past different toned image transfer stations to successively apply differently colored image portions to the sheet. Alternatively successive color separation images may be transferred to an intermediate member which accumulates a single multicolor toned image, which is then transferred to a sheet. Such constructions are complex.

Accordingly it would be desirable to provide a simplified and dependable multicolor system for toning and printing images.

SUMMARY OF THE INVENTION

It is one object of the invention to provide a simplified printing system for multiply toned latent image transfer.

It is another object of the invention to provide an energy efficient multicolor printing system.

It is another object of the invention to provide a multicolor printing system adaptable to different latent image forming and toning technologies.

A printing system in accordance with the present invention operates by forming a first electrostatic latent image on a dielectric member and applying a first color toner to form a toned image. The toned image is then stabilized on the dielectric member, after which a second, different color or type of toner is applied to different latent image regions. In this manner a multiply toned image is formed on the dielectric member. The multicolor or multiply toned image is then transferred to a recording sheet and fixed. At one or more intermediate image forming stages, the stabilization is effected by heating and then cooling the unconsolidated toner already applied to the latent image.

In one construction, different reservoirs of toner are biased to different voltage levels so that the toner from each reservoir preferentially adheres to a different portion of a single electrostatic latent image. In another construction, a separate electrostatic latent image is applied in turn for each desired toner or toner color. In further Preferred embodiments of either of these constructions, the electrostatic latent images are formed by electronically driven charge deposition devices such as ionographic printheads or electrostatic arrays. In such embodiments employing a second printhead or array to form a second or subsequent toner, a non-conductive toner is preferably employed, at least for the initially-applied color or colors of the toned image. In other embodiments, the electrostatic latent images may be formed by optical means on one or more photosensitive drums, and the charge image thereby formed may be transferred to an intermediate electrostatic latent image bearing belt for the toning and printing operations. In still other embodiments, the electrostatic latent image may be optically formed on a photoconductive belt.

BRIEF DESCRIPTION OF THE DRAWINGS

These and other aspects of the invention will be understood from a discussion of principles of the invention and of representative embodiments illustrated in the drawings, wherein:

FIGS. 4 and 5 illustrate different embodiments of systems of the type illustrated in FIG. 1; and FIG. 6 illustrates another embodiment of the invention.

DETAILED DESCRIPTION OF THE INVENTION

Figure 1:
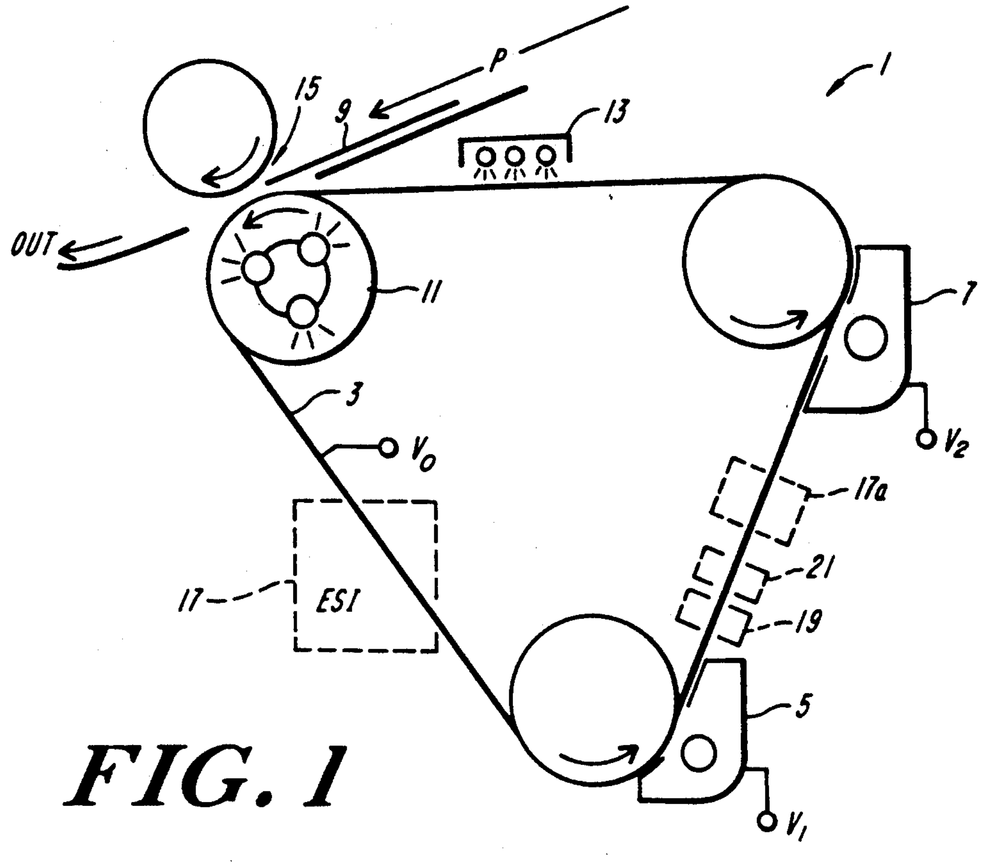
FIG. 1 illustrates in schema a system according to the invention for printing with two toners.

A printing system 1 for printing with plural different toners according to the invention has a moving dielectric member 3 which, in the preferred embodiment, is a belt which, as discussed further below, preferably has a fast thermal response time. Belt 3 carries an electrostatic latent image past different processing stations at which toner is adhered from two or more different toner reservoirs 5, 7, to form a multiply toned image. The multiply toned image is carried by the member to a transfer station where it is transferred to a sheet as a permanent image. The transfer and fixing is illustrated as a single step transfuse operation in which a heated pressure roller 11, possibly following a preheater 13, brings the toned image to a melting temperature and transfers and fuses the heated toned image to a sheet 9 as the sheet is fed through a nip 15 along a sheet feed path P.

Located before the first toner reservoir 5 along the direction of motion of the dielectric belt 3 is an electrostatic latent image forming station 17 at which an electrostatic latent image is either directly formed on or is transferred to the belt 3. The belt 3 then passes a toner reservoir 5 at which a toner applying mechanism such as a rotating brush applies toner to charged portions of the belt.

Following the application of toner of a first color at the first reservoir, the image-bearing portion of the member 3 moves past a first station 19 at which a radiant energy heater, hot platen or hot roll raises the temperature of the applied toner sufficiently to melt it, and Past a second station or region 21 preferably including a cooling heat exchanger or cold roll, which cools the toned image below its melt temperature so that it is consolidated or stabilized on the member 3. When the first toner image is thus stabilized, a second toner reservoir applies a second toner of different characteristics to the belt. In its stabilized or consolidated state, the first toned image is not subject to toner dispersion or image distortion upon subsequent exposure to changing voltage distributions or physical contact with the later toner applicator 7. As discussed further below, additional toners may then be applied, using the same technique of stabilizing the initial toners.

One embodiment of the invention employs two toners, a first colored toner, e.g. black, for forming a visible image, and a second toner which may also be black for forming a magnetically readable image. This embodiment of the apparatus may print checks with a first portion including the formal graphic elements, payor's name, signature line and the like toned with a conventional toner, and a separate portion of the latent image corresponding to the strip of magnetic identification characters toned with a MICR compatible magnetically readable toner. In other embodiments, it may be desirable to employ for one of the toners a toner composition which is visible only under certain conditions, e.g., when viewed under ultraviolet light or when reacted with a reagent. Such systems may be used to implement security safeguards in copied documents, or to authenticate as originals certain printed documents such as checks or financial instruments. The major contemplated application of the invention, however, involves the use of a different colored toner for each toner reservoir in the system in order to print multicolor or process color images.

Accordingly, for clarity of exposition in this application, the term "multicolor toned image" or the term "different color toner" shall generally be employed, and shall be understood to include "image toned with multiple different toners" and "toner having a different characteristic", respectively. Thus, the term "color", while used for simplicity, shall be understood to mean simply any salient toner characteristic which is to be imparted to the final image. For example, in the check printing example described above, both the MICR characters and the check form may toned in black color, but the toners would have different (magnetic and non-magnetic) characteristics, and are thus referred to as of different color for purposes of this disclosure.

Continuing with a description of FIG. 1, a further electrostatic latent image may be applied to member 3 by an imaging unit 17*a* before the second color toner is applied to the charge areas by toner reservoir/applicator assembly 7. The unit 17*a* is shown in phantom, however, because, in various embodiments of this basic construction discussed below, such an additional imaging unit 17*a* is not required, and the operating parameters of the system are controlled to form a single latent image which receives plural different color toners.

This may be accomplished by depositing an electrostatic latent image at the first station 17 such that only a portion of the latent image is quenched by the application of toner from the first reservoir/applicator 5, and the remaining portions of the image remained charged to attract the second toner from the second reservoir-/applicator 7. Such operation may be effected, for example, by employing a toner which is attracted to negatively charged areas for the first color, a toner which is attracted to positively charged areas for the second color, and by biasing both toner reservoirs to a voltage level intermediate the lowest and highest voltage levels appearing in the latent image formed on the member 3.

In one such embodiment, both reservoirs are biased and the electrostatic latent image is formed such that regions to receive the first color are charged to a level below the bias voltage of the first toner reservoir, while regions to receive the second color are charged to a level above the bias voltage of the second reservoir. Both bias voltages may be the same, or differences in the two reservoir bias voltages may be applied to the two different reservoirs in order to null the effects of any residual charge remaining in the first-toned areas. The formation of latent images wherein a particular range of charge levels corresponds to a particular color or toner characteristic is preferably implemented using an electrically controlled charge emitting printhead as described in U.S. Pat. No. 4,160,257, U.S. Pat. No. 4,628,227, or others. The amount of charge deposited at each point of the latent image by such a printhead may be varied by controlling the ON time of the corresponding printhead electrodes as described in U.S. Pat. No. 4,841,313, and may also be controlled by varying the extraction or bias voltage applied to the printhead electrodes.

The dielectric latent-image bearing member may be an intermediate transfer member, such as the belt of a TESI-type imaging system which receives the latent image from a photoconductive imaging drum. Preferably, however, the latent-image bearing member is one on which the latent image has been directly deposited, for example, by means such as an electrostatic or ionographic charging array such as the ionographic printhead as described in the aforesaid U.S. patents.

For most efficient operation of the belt-type member 3 of FIG. 1 to receive latent images, to attract and transport toner, and to transfer the heated toner directly to a sheet 9, it is Preferable that the belt have a sufficiently short thermal response time so that without lowering the sheet feed rate, the belt may be cooled before passing each toning station, and the one or more colored toners already applied are coalesced, consolidated or otherwise stabilized on the belt and maintain their image integrity.

Preferably, such a member 3 is a belt of the type described in the United States patent application of William R. Buchan et al entitled Powder Transport Fusing and Imaging Apparatus, Ser. No. 355,994 filed on May 23, 1989, now issued as U.S. Pat. No. 4,012,291, and commonly owned by the assignee of the present invention. Reference is made to that patent application for a more detailed discussion of the preferred construction of such a belt, and the achievement of desired mechanical, electric and conductive characteristics including compressive modulus and surface release characteristics in a belt of fast thermal response and low thermal mass. The aforesaid patent application is hereby incorporated by reference for purposes of such disclosure. As relevant to the present discussion, however, it is enough to state that the belt so constructed is a single dimensionally stable member of a multilayer construction on which a charge image is written, on which a toned image is formed, and from which a heated toned image may be directly transferred to a sheet by pressure.

As noted above, it is also desirable that the belt have a sufficiently small thermal mass and thickness dimension that the heating and cooling of the toner described above may be effected in less than the short time available for printing a sheet, typically below one to several seconds.

Figure 2:
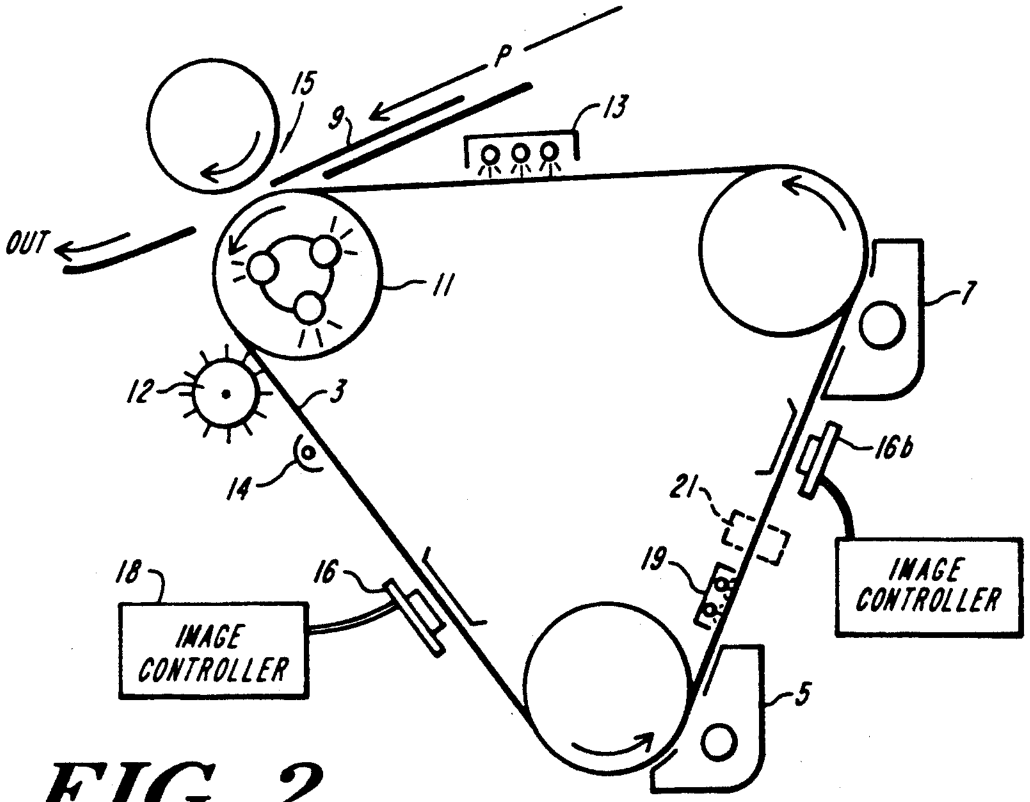
FIG. 2 illustrates a particular embodiment of a system of the type illustrated in FIG. 1.

FIG. 2 illustrates one embodiment of the invention constructed in accordance with the general structure of FIG. 1.

As illustrated in FIG. 2, this embodiment employs an electronically controlled charge deposition printhead 16 which forms an initial electrostatic latent image on the belt member 3. A cleaner roll 12 and an erase rod 14 each located ahead of the printhead assure that any residual toner and any residual charge are both removed from the belt before the start of a printing operation. The Printhead 16 is controlled by an electronic image control circuit 18 to deposit charge in a two dimensional pattern corresponding to the desired multi-color image. The charge pattern is deposited by selectively actuating electrodes of the array in an imagewise pattern synchronized with rotation of the belt's drive system.

In this embodiment, the first printhead deposits a charge level for each dot position at which the first color toner is to be deposited. For example, with a red/green/blue (RGB) three color system, the controller 18 actuates electrodes only for those dot positions at which one, e.g., the blue, toner is to be adhered. The blue toner is placed in the first reservoir 5 to tone the deposited latent image. One or more additional latent images are later deposited in those image regions where it is desired to adhere each of the remaining colors. In FIG. 2, one such additional printhead **16*b*** is shown for printing the second color regions.

In an alternative mode of operation, the first printhead 16 may be operated by controller 18 to lay down a latent image in which regions of different charge levels correspond to regions which are to receive different toner colors. To selectively tone the image with different color toners, the different toner reservoirs are then biased as described above so that each toner is attracted only to regions having a specified range of surface potential, with the different ranges being separate portions of the total range of deposited charge image. Two reservoirs 5,7 are illustrated, biased to voltages $V_1$ and $V_2$ as described above.

In a further embodiment of such a multi-level charge printer, at least one subsequent printhead is provided to lay down areas of latent charge image for subsequent colors. As illustrated, a second printhead **16*b*, positioned downstream of a consolidated previously toned image on belt 3, deposits charge on image regions which are to be toned by reservoir 7**. When using a printhead of the type shown in the aforesaid U.S. patents, which is spaced approximately 0.25 millimeters from the belt and is operated at a potential relatively close to the air breakdown voltage of two to three thousand volts/millimeter, it is preferable to use non-conductive toners for all toning steps ahead of the printhead in order to avoid unwanted arcing. The order in which the different color toners are applied may be selected to minimize speckling of the final image, or to achieve process control for special color graphic effects.

Figure 2A:
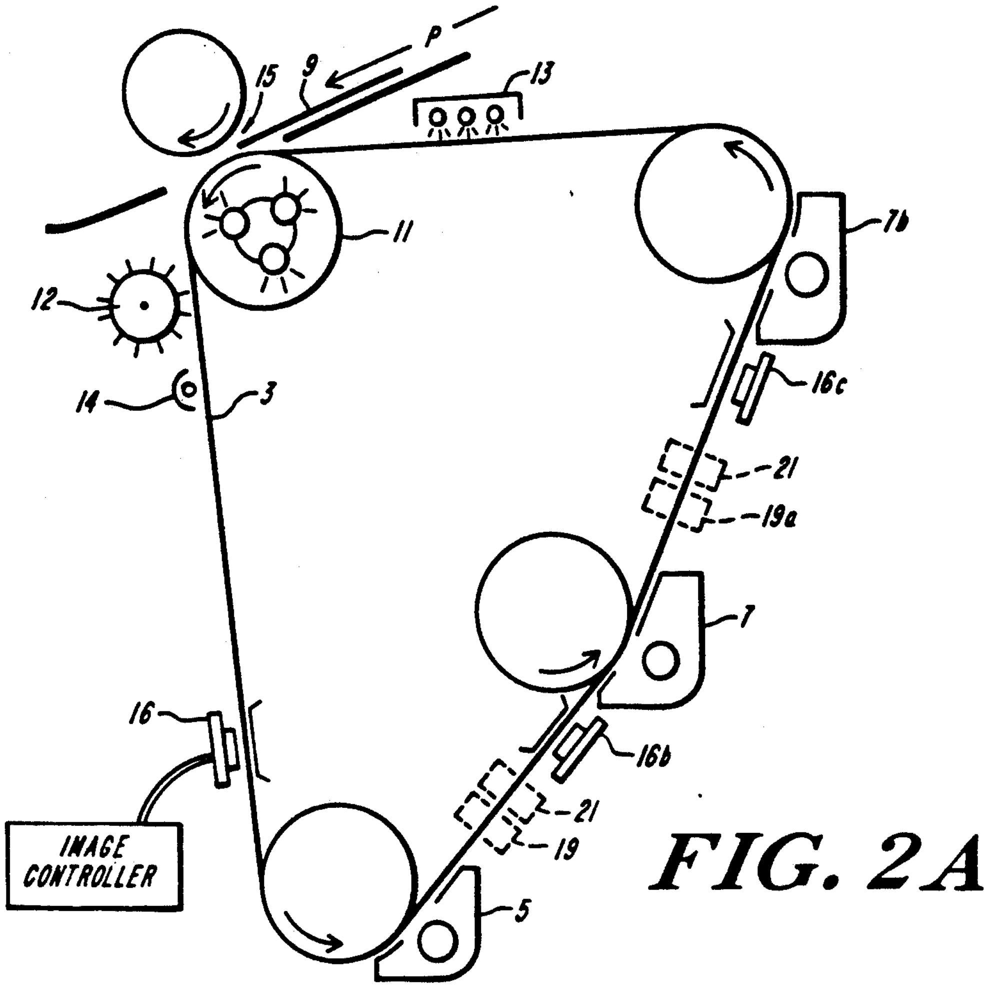
FIGS. 2A-2C illustrate different embodiments of the system of FIG. 2 with multiple imaging units.
Figure 3:
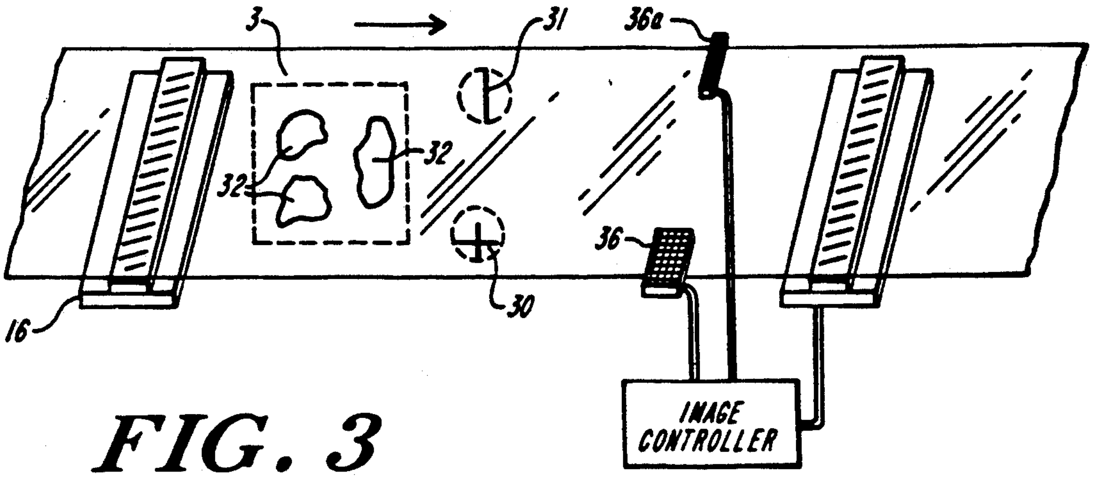
FIG. 3 illustrates alignment of separately formed latent images.

FIG. 2A illustrates an extension of the construction shown in FIG. 2, wherein three printheads 16, **16*b* and 16*c* are provided to charge the image areas toned by three separate toner applicators 5, 7 and 7*b*, respectively. A heating-cooling leg 19, 21 or 19*a*, 21*a* precedes each of the later printheads to consolidate the intermediate already-toned images on the belt. When using separate pointwise-actuated electronic printhead arrays to form the latent image areas, the different color image areas may be aligned as shown in FIG. 3**, which shows a view facing the belt. Heating, cooling and toning assemblies are omitted for clarity of illustration.

The first printhead 16 lays down a latent image registration mark 30 on an edge of the belt outside the imaging area, and, after a certain number of belt encoder pulses, initiates the deposition of the latent image 32 for the first color or colors. The mark 30 is a simple cross having two arms aligned with the belt width and the axis of travel. A detector 36 located near printhead **16*b* detects the registration mark and provides row and column justification signals to the controller for that printhead to synchronize and shift its write operation into registry with that of the first printhead. The column justification signal causes the image to be shifted transversely to the belt, whereas the row justification signal offsets the time at which the write operation starts. The same registration mark may also be detected further along the line by a further detector and used to align and synchronize the operation of a third or subsequent Printhead. In addition to mark 30, a second mark 31 may be laid down on the other edge of the belt 3 and detected and compared to the corresponding arm of mark 30, by a second detector 36*a*. This mark may consist of only a row marker, and serves when detected to indicate the degree of belt skew. The detectors 36, 36*a* are mounted on a fixed base a known distance from printhead 16*b***, so their position signals provide an exact indication of the offset correction required for operation of the printhead to align its image with the previously deposited ones.

The invention contemplates that four Printheads may be used to successively lay down charged regions for four colors, or different combinations of one or more printheads may be operated to each lay down the regions for one, two or more colors by using the charge-coding and reservoir biasing construction described above.

The invention further contemplates that a single printhead may be used, with the belt making successive revolutions past the printhead to deposit each latent image. In that case, means such as movable shaft bearing mounts are provided to disengage the pressure nip 15 and cleaner roll 12 during the intermediate imaging stages, and these elements are returned to their operative positions for transfer of the completed multiply toned image to a print. Similarly, the toner reservoirs may have selectably closeable covers, retractable brushes or selectively biased electrostatically operated applicators, which enable only one reservoir to deposit toner in each pass of the belt. Once all colors have been toned, a single sheet of paper is then fed once through the machine to receive the multicolor image.

In yet another embodiment of the invention, an ionographic printhead of the general type described in the aforesaid patents is operated to deposit both positive and negative charges in different regions of the latent image and lays down a charge-coded latent image. Operation of a printhead to achieve bipolar charge deposition in this manner is described in U.S. patent application Ser. No. 434,425, of Wendell J. Caley, Jr. et al, filed on Nov. 13, 1989, now issued as U.S. Pat. No. 5,014,076 and assigned to the assignee of the present invention. For purposes of a description of such operation, the text of that patent application is incorporated herein by reference. In this embodiment, the bipolar latent image is then toned by two different toners which are attracted to the respective regions of the opposite polarity, and both toner reservoirs may simply be grounded rather than biased to different or non-zero voltages. Furthermore, with a bipolar printhead of his type, when electrostatic registration marks are applied to the belt to achieve registration for a multistep process, the printhead may "erase" prior registration marks by simply writing over them with charge carriers of an opposite polarity to neutralize the region of the belt involved.

Figure 2B:
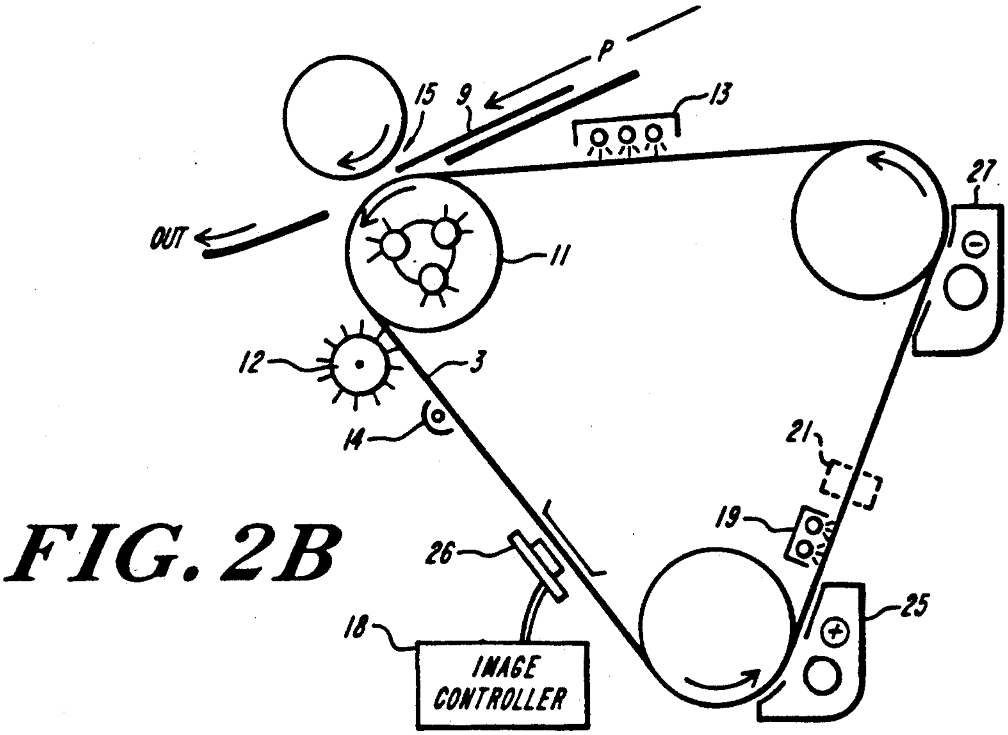

FIG. 2B illustrates a basic embodiment of a device having a bipolar printhead 26. In this device the reservoirs 25, 27 each contain a toner which is attracted to regions of an opposite polarity, denoted (+) and (−) toners for clarity. The heater 19 for consolidating the first toner is indicated as a radiant heater directed at the back of belt 3, but may include heaters or flash tubes directed at either the back or the toned side of the belt, or a heated roller over which the belt travels. For light colored or non-absorbing toners, a hot roller construction or a radiant heater which heats the belt is preferred.

Figure 2C:
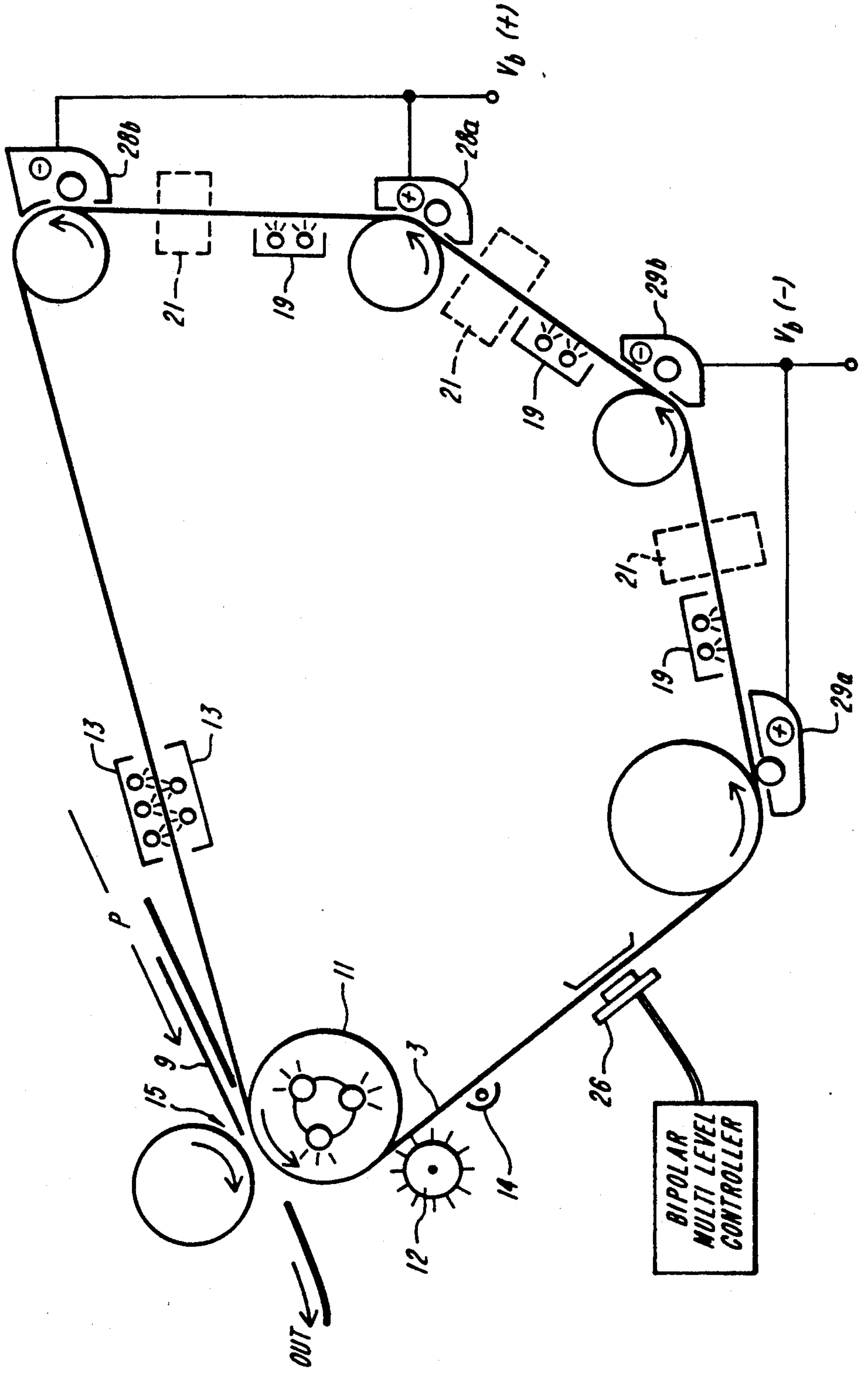

In a preferred embodiment of the apparatus a bipolar printhead deposits a charge coded range of charges in each of the positively and its negatively charged regions, and four colors are toned on the latent image formed by the singe printhead. This is done by employing two toners which are selectively attracted to positive and negative charged areas in reservoirs 28*a*, 28*b* that are biased to a voltage $V_b(+)$ in the middle of the potentials of the positively charged regions, and two more toners of opposing polarity in reservoirs 29*a*, 29*b* which are biased to a voltage Vb(−) in the middle of the potential range of the negatively charged regions. Between successive toners, a heating and cooling portion consolidates the toned intermediate image. Such a system is illustrated in FIG. 2C.

Figure 4:
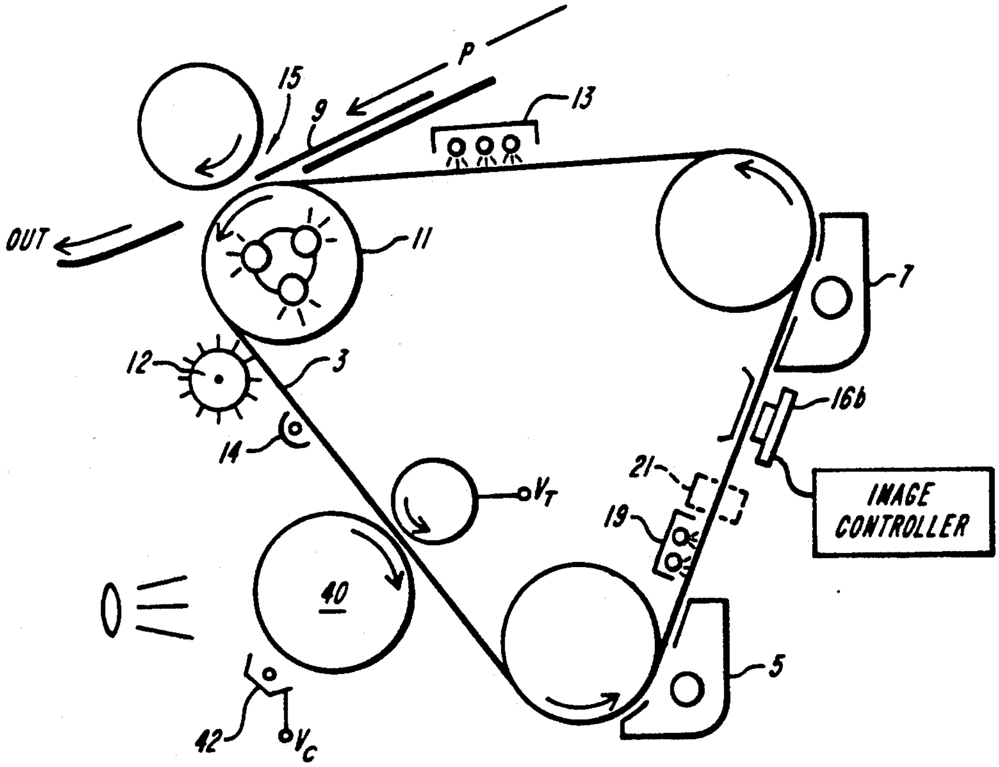

FIG. 4 shows another variation in construction, still within the general architecture illustrated in FIG. 1. In this embodiment, a photoconductive drum 40 is brought to a uniform charge level $V_c$ by a corona charger 42, and is then exposed to imaging illumination, e.g., by optics which may consist of a document imaging objective lens and mirror, or a modulated laser beam image generating assembly. The illumination determines the regions of charge on the drum which then rotates against belt 3 and transfers its latent image thereto by capacitive charge sharing. As in the previous embodiments, the latent image is then toned by a single toner if a one-color latent image was deposited, or two toners from positively and negatively biased reservoirs if a two-color charge coded latent image was deposited. In either case, the first color is consolidated by heating and cooling of the belt at 19, 21, before application of the second color or toner. Further electrographic printhead arrays 16*b*, 16*c* as in FIGS. 2, 2A are then preferably operated to deposit charge for any additional colors.

FIG. 5 illustrates another contemplated embodiment wherein a belt structure 3*a* similar to that of FIG. 1 has a latent image formed thereon by optical imaging means, such as a laser write beam or image projection optics operating in conjunction with a corona charging unit or other uniform charging device. In this case, the belt is fabricated with a photoconductive filler material to permit optical formation of the latent image on the belt.

While the foregoing embodiments have involved a belt as either the original or an intermediate latent image bearing member, the invention also contemplates the formation of multiply-toned images on a photoconductive drum member. Such an embodiment is illustrated in FIG. 6.

In this embodiment, an imaging drum 50 which is illustrated as a photoconductive drum upon which a latent image is formed by conventional optical elements 55, rotates past heating and cooling stages 19, 21 between successive toner reservoirs 5, 7*a* to consolidate the toner. The heater elements may, for example, be microwave or radiant energy heaters, and the cooling elements may include diverse cooling means such as a cooling blower or a cooled roller which contacts the inner surface of drum 50.

In addition to the different overall constructions which may embody an apparatus according to the invention, the practice of the invention further contemplates multitoner printing methods employing novel combinations of elements.

One such embodiment is a printing method wherein an electrographic printhead applies a latent image on top of an already toned image on the dielectric member. For this embodiment the operation of any of the previously described multi-pass or multi-head ionographic printers is modified by employing as an initial or as one of the non-final toners a dielectric material. After that toner has been deposited and consolidated, an electrical charge latent image is then laid down on top of the consolidated dielectric toner and this latent image is then toned with another application of toner. The other toner may be the same one, for building up a thicker image, or may be a different toner for adding an additional color or other image characteristic.

It will be further understood that the invention contemplates various other substitutions and modifications. For example, the toner reservoirs have been described as applying toner by a contact process using, for example, a rotating brush, but the invention also contemplates the use of non-contacting or "hopping" toner. Liquid toners may also be employed, it being understood that the step of consolidation for such a toner entails not just evaporating the carrier, but also melting the toner onto the imaging member.

This completes a description of the multi-toner printing system according to the present invention, and several representative embodiments thereof for printing with two, three or more toners or toner colors. Basic embodiments of the invention in systems utilizing elements of different prior art imaging devices being thus described, other different variations, modifications and adaptations will occur to those skilled in art, and are considered to lie within the scope of the invention, as defined by the claims appended hereto.

What is claimed is:

1. A method of producing a multiply-toned print on a recording member, such method comprising the steps of (i) forming on a latent image bearing member having surface release characteristics a first electrostatic latent image of regions to be toned by a first toner (ii) toning said first electrostatic latent image with said first toner to produce a first toned image on said latent image bearing member (iii) melting and then cooling said first toned image to consolidate it on the latent image bearing member (iv) forming a successive latent image of regions to be toned by a successive toner on the latent image bearing member and toning said successive latent image with the successive toner to produce a composite image including consolidated regions toned with said first toner and regions which are toned with the successive toner, and (v) melting said composite image and transferring the composite image to a recording member.

2. The method of claim 1, wherein the step of forming an electrostatic latent image on a latent image bearing member includes depositing an electric charge on the member by a pointwise actuated charge depositing printhead.

3. The method of claim 2, wherein at least said first toner is non-conductive.

4. The method of claim 1, wherein the latent image bearing member is a dielectric belt having a thermal response time less than the paper feed interval, and wherein the step of cooling is effected by contacting the belt with a cooler surface.

5. The method of claim 1, wherein the latent image bearing member is a dielectric belt, and a step of forming an electrostatic latent image is Performed by transferring an electrostatic latent image to the belt from an imaging drum.

6. The method of claim 1, wherein the steps of forming a first electrostatic latent image and of forming a successive latent image are performed by forming a single latent image having differing levels of charge in regions to be toned by toners of different colors.

7. The method of claim 6, wherein the first and the successive toner are attracted to regions of differing polarity.

8. The method of claim 6 or 7, wherein the first and the successive toners are biased to voltage levels which are intermediate in the range of potentials forming the single latent image.

9. The method of claim 2, wherein said printhead is activated to deposit positive and negative charge in regions of said latent image.

10. The method of claim 2, wherein said printhead forms latent image regions of differing charge polarity and of differing charge amplitude.

11. The method of claim 1, wherein said first and said successive toner each have a different color.

12. The method of claim 1, wherein said first and said successive toner have different magnetic properties.

13. A method of producing a multicolor print on a recording member, such method comprising the steps of forming a first toned image of a first color on an intermediate latent imaging member having surface release characteristics melting the first toned image to consolidate it on the intermediate latent imaging member, forming a second toned image of a second color on the intermediate latent imaging member, sid first and second toned images combining to form a combined image of plural colors on said intermediate latent imaging member, and transferring and fusing the combined image from said intermediate latent imaging member onto a recording member to form a final image.

14. The method of claim 13, further comprising the step of after forming the combined image, melting the combined image to consolidate it and forming a further toned image of a further color on the intermediate latent imaging member which augments the combined image to form a combined image with more colors, and then transferring and fusing the combined image with more colors onto the recording member as a final image.

15. The method of claim 14, wherein the step A is repeated with an additional color.

16. The method of claim 13, further comprising the steps of determining the registration of said first toned image and forming said second toned image in registry with said first, toned image.

17. Apparatus for producing a multiply-toned print on a recording member, such apparatus comprising means for forming on a latent image bearing member having surface release characteristics a first electrostatic latent image of regions to be toned by a first toner means for toning at least a portion of said first electrostatic latent image with the first toner to produce a first toned image means for melting and then cooling to consolidate said first toned image on the latent image bearing member to form a first intermediate image means for forming and toning regions by at least one further toner applied to the latent image bearing member to constitute a combined multiply-toned image, and means for melting the combined multiply-toned image and transferring to a recording member.

18. Apparatus according to claim 17, wherein said means for forming a first electrostatic latent image includes an electrically controlled charge deposition printhead array.

19. Apparatus according to claim 18, wherein the apparatus includes plural printhead arrays for depositing latent charge images for plural different toners in sequence.

20. Apparatus according to claim 18, wherein a printhead array deposits a charge coded latent image wherein different regions are charged to different levels for receiving between two and five different toners.

21. Apparatus according to claim 18, comprising a single printhead array and plural toner reservoirs for applying different color toners to the latent image bearing member, and means for biasing at least one of said plural toner reservoirs to a voltage intermediate in a range of potential levels of the latent image.

22. Apparatus according to claim 19, further comprising means for operating said plural printhead arrays to deposit latent charge images in registry.

23. Apparatus according to claim 22, wherein the combined multiply-toned image is transferred to the recording member in a single pass.

24. Apparatus according to claim 20, wherein said printhead array is operated to produce positively charged and negatively charged regions of the latent image.

25. Apparatus according to claim 17, wherein said means for forming a first electrostatic latent image includes means for applying an imagewise distribution of light energy to the latent image bearing member.

26. Apparatus according to claim 17, wherein one said toner is a MICR compatible magnetically readable toner.

27. Apparatus according to claim 17, wherein the latent image bearing member is photoconductive.

28. Apparatus according to any of claims 17, 18 or 27, wherein the latent image bearing member transfers the combined multiply-toned image at a transfer nip, and further comprising means for disengaging the transfer nip so that the combined image may be formed during multiple passes of the latent image bearing member.

29. Apparatus according to claim 17 or 18, wherein a said toner is of a dielectric composition and the means for forming and toning regions deposits a latent charge image onto a region which has been toned with said dielectric composition.

30. Apparatus according to any of claims 17, 18 or 27 wherein said latent image bearing member is a drum.

31. Apparatus according to any of claims 17, 18 or 27 wherein the latent image bearing member is a belt.

* * * * *